US012225642B2

(12) United States Patent
Parsadayan et al.

(10) Patent No.: US 12,225,642 B2
(45) Date of Patent: Feb. 11, 2025

(54) AUTODIM LEDS ON A BARRIER OPERATOR

(71) Applicant: Intelligent Entry Machines LLC, Irvine, CA (US)

(72) Inventors: Walter Parsadayan, Newport Coast, CA (US); Andrew Parsadayan, Newport Coast, CA (US); Peter Parsadayan, Newport Coast, CA (US)

(73) Assignee: Intelligent Entry Machines LLC, Irvine, CA (US)

( * ) Notice: Subject to any disclaimer, the term of this patent is extended or adjusted under 35 U.S.C. 154(b) by 120 days.

(21) Appl. No.: 18/164,279

(22) Filed: Feb. 3, 2023

(65) Prior Publication Data

US 2023/0254955 A1 Aug. 10, 2023

Related U.S. Application Data

(60) Provisional application No. 63/306,672, filed on Feb. 4, 2022.

(51) Int. Cl.
*H05B 45/14* (2020.01)
*H05B 45/12* (2020.01)

(52) U.S. Cl.
CPC ............ *H05B 45/14* (2020.01); *H05B 45/12* (2020.01)

(58) Field of Classification Search
CPC .......... H05B 45/14; H05B 45/12; Y02B 20/40
See application file for complete search history.

(56) References Cited

U.S. PATENT DOCUMENTS

2007/0247096 A1* 10/2007 Tang ................... E05F 15/70
318/280
2016/0286619 A1* 9/2016 Roberts ............... F21V 23/0442

FOREIGN PATENT DOCUMENTS

WO WO-2008097477 A1 * 8/2008 ........... G05B 19/042

* cited by examiner

*Primary Examiner* — Abdullah A Riyami
*Assistant Examiner* — Syed M Kaiser
(74) *Attorney, Agent, or Firm* — Martin Fessenmaier; Umberg Zipser LLP

(57) ABSTRACT

A controller for a barrier operator is provided. The controller includes an energy source and a sensor configured to determine whether a predetermined event is satisfied and generate a modulation signal based on the predetermined event. The controller further includes a dimming device communicatively coupled to the sensor and the energy source, wherein the dimming device generates a modified current or a modified voltage in response to the modulation signal. A light source, most preferably an LED, is then electrically coupled to the dimming device and to illuminate in response to the modified current.

18 Claims, 3 Drawing Sheets

AUTODIM LEDS ON A BARRIER OPERATOR

This application claims priority to our U.S. provisional patent application with the Ser. No. 63/306,672, filed Feb. 4, 2022, and which is incorporated by reference herein.

FIELD OF THE INVENTION

The field of the invention is devices and methods for controllers of barrier operators, especially controllers including light sources.

BACKGROUND OF THE INVENTION

The background description includes information that may be useful in understanding the present invention. It is not an admission that any of the information provided herein is prior art or relevant to the presently claimed invention, or that any publication specifically or implicitly referenced is prior art.

All publications and patent applications herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

Movable gates or barriers to control or restrict access to residential or commercial properties are well known in the art and, depending on the particular location and need, will move the gate or barrier in a horizontal or vertical motion, or swing or pivot a gate or barrier about a point of rotation. Still further known gates and barriers can be communicatively coupled to a controller spaced from the gate or barrier that provides operational control and status for the gate or barrier. Most commonly, the gate or barrier is moved by an operator that is controlled via a remote signal coming from the controller.

Common controllers often include a variety of LED indicators to indicate the status of the gate or barrier, or its associated devices (e.g., a traffic light, warning monitor, a tamper monitor, a lock, loitering monitor, gate position monitor.) Traditionally, the LED indicators in such controllers are of a fixed brightness and either of purposefully low or purposefully high intensity without regard for environmental or situational considerations at the location of the controller. Consequently, the LED indicators are either too weak for direct sunlight (the typical time of day for installation, not being visible unless up close, let alone from afar) and/or too bright for the night (a typical time for maintenance/repair as opposed to installation).

Thus, even though various controllers, systems, and methods including LED indicators are known in the art, all or almost all of them suffer from several drawbacks. Therefore, there remains a need for controllers, systems, and methods including improved LED indicators.

SUMMARY OF THE INVENTION

The inventive subject matter is directed to various systems and methods for illuminating a light source of a controller in which the LED indicators are dimmable under certain conditions to improve visibility of the LED indicator, to reduce eye strain to users of the controller, and to reduce energy consumption of the controller.

In one embodiment, a controller for a barrier operator is provided. The controller includes an energy source that is configured to provide a current. The controller further includes a sensor configured to determine whether a predetermined event is satisfied and to generate a modulation signal based on the predetermined event. The controller further includes a dimming device communicatively coupled to the sensor and the energy source. The dimming device is configured to generate at least one of a modified current or a modified voltage in response the modulation signal. The controller further includes a light source electrically coupled to the dimming device and configured to illuminate in response to the modified current or the modified voltage.

In another embodiment, a method for illuminating the light source of the controller is provided. The method includes determining whether a predetermined event is satisfied and generating a modulation signal in response to the predetermined event. The method further includes generating a modified current or a modified voltage in response to the modulation signal. The method further includes illuminating the light source in response to at least one of the modified current or the modified voltage.

Viewed from a different perspective, the inventors contemplate an automatically enabled and brightness adjusted system for any indicator lights (e.g., LED indicators) of the controller. The LED indicators may provide direct or ambient illumination mode (e.g., either adjusted to ambient light levels or one of two light levels according to incident sunlight or some other ambient light-level threshold). It should therefore be appreciated that such controller will solve several problems specific to gate openers. In many cases, as controller installations are out of the way, or installers have failed to provide adequate sources of light proximate the controller thereby burdening the installer or servicer of the controller or the barrier operator. Therefore, an automatically enabled light source can help the installer or servicer of a controller of the barrier operator.

The controller can utilize high output LED light sources that can be dimmed for use during the day or at night for suitable and convenient illumination. The controller can include sensors, such as photocell ambient light sensors to adjust the illumination of the LED light sources in response to the ambient light. Alternatively, or in addition to, a cover (e.g., door) detection system can used to verify light level changes and turn off illumination of the LED light sources and other systems (e.g., any displays). Furthermore, auto-off of the LED light sources may be triggered by a timer or a photocell ambient light sensor as ambient light levels increase or decrease.

For example, conventional LED light sources that are used to indicate status are unlikely to be visible during the day from a distance and possibly not even visible unless very close to the machine at a specific viewing angle. This is problematic because it is common to need to see the status of LED light sources from afar, so to avoid the use of another person, such as a helper, to watch the LED light sources from up close and relay the status to the user (e.g., the installer or servicer).

For controllers without cover removal detection, a manual on/off switch with a timer may be utilized. This is to avoid the situation of adjusting to a low light level expecting it to be night and needing illumination when actually the cover is closed, and no illumination is necessary. The timer may either be for a long period, such as 10 hours. Alternatively, the ambient light sensor can detect the subtle increase in ambient illumination and determine whether to illuminate the LED light sources accordingly.

The controller may further include additional dimming devices, such as a manual variable resistor dial or slider, that allows for manual dimming of the LED light source. In one embodiment, the additional dimming device(s) may further modify the current or voltage supplied to the LED light source by the dimmer based on the sensor. In another embodiments, the additional dimming device(s) may generate a signal to the controller to modify the current or voltage supplied to the LED light source and thus overrides the dimming based on the sensor.

Viewed from a different perspective, the controller, system, and method provided herein conserves electricity by reducing unnecessary energy consumption by LED light sources when the LED light sources are not needed while remaining responsive to a user's needs. Auto-off of the LED light sources can maximize its lifespan, whether by use of a timer or by a cover removal detection system. Even without an auto-off, the LED light sources can have an increased lifespan and lower energy consumption while it is dark (i.e., whenever the cover is on) due to the very low duty cycle that comes from the low-frequency pulse width modulation (PWM) or other power control needed for the corresponding low light level. Certain components such as e-paper displays may be damaged under sustained UV (say if the cover is left off too long or on accident). Therefore, selective control of illumination of the LED light sources can reduce the need to open the cover or notify a user that cover is open.

Various objects, features, aspects, and advantages of the inventive subject matter will become more apparent from the following detailed description of preferred embodiments, along with the accompanying drawing figures in which like numerals represent like components.

BRIEF DESCRIPTION OF THE DRAWINGS

The present invention will hereinafter be described in conjunction with the following drawing figures, wherein like numerals denote like elements.

DETAILED DESCRIPTION

Figure 1:
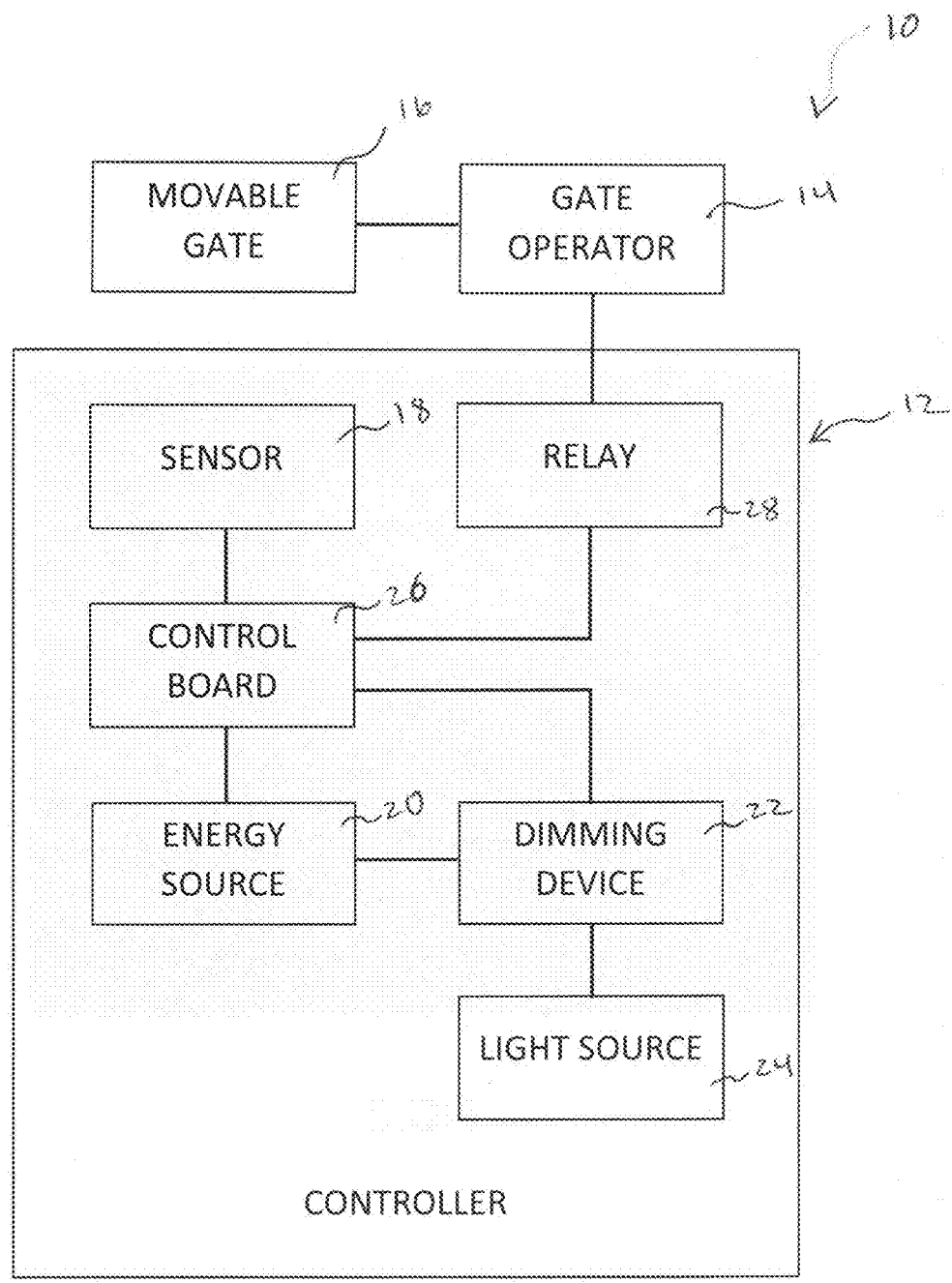
FIG. 1 is a block diagram illustrating an of a system including a controller and a barrier operator.

The following detailed description is merely exemplary in nature and is not intended to limit the invention or the application and uses of the invention. Furthermore, there is no intention to be bound by any theory presented in the preceding background or the following detailed description. It should be understood that throughout the drawings, corresponding reference numerals indicate like or corresponding parts and features. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

The inventors have discovered systems and methods of illuminating LED indicators (also referred to herein as "light source") for controllers of barrier operators in which the LED indicators are dimmable under certain conditions to improve visibility of the LED indicator, to reduce eye strain to users of the controller, and to reduce energy consumption of the controller. Such illumination control advantageously allows for defining, independently, an appropriate illumination level for a variety of predetermined events, which in turn, for example, enables such controllers to be utilized by users in a variety of ambient light conditions. Moreover, the LED indicators can be electrically isolated from (operated in an electrically independent circuit) components controlling the barrier operator such that illumination of the LED indicator is not limited to when a circuit is "closed" during operation such barrier operator. Viewed from a different perspective, for example, the LED indicator can be associated with a lock of a barrier operator and configured to be illuminated even when the lock is not activated via a "closed" circuit.

FIG. 1 is a block diagram illustrating a non-limiting embodiment of a system 10 including a controller 12 and a barrier operator 14. The system 10 may further include a movable gate 16 operatively coupled to the barrier operator 14. The controller 12 may be electrically coupled to the barrier operator 14 and, in particular, controls operation of the barrier operator 14. In various embodiments, the controller 12 is located away from the barrier operator 14 (e.g., in a security booth or at a wall proximal to the gate).

The controller 12 includes a sensor 18 configured to determine whether a predetermined event is satisfied and generate a modulation signal based on the predetermined event. It is to be appreciated that the sensor 18 may also be configured to be in a state free of any signal generation so long as the sensor 18 remains responsive to determining whether the predetermined event is satisfied for generating the modulation signal.

The sensor 18 may include an ambient light sensor, a switch, a timer, a proximity sensor, or combinations thereof. It is to be appreciated that the controller 12 may include other types of sensors so long as the sensor is capable of determining whether the predetermined event has been satisfied (e.g., a hall sensor, a dry contact sensor, etc.). The predetermined event may include a certain amount of light being proximate the controller 12, actuation of a switch by a user, moving of a cover between an open position and a closed position (described in greater detail below), lapse of a certain amount of time, movement proximate to the controller 12, or combinations thereof. However, it is to be appreciated that other predetermined events may be utilized by the controller 12 depending on the sensor 18 utilized or conditions proximate the controller 12.

The controller 12 further includes an energy source 20 configured to provide an electrical current. The energy source 20 may be an AC energy source, a DC energy source (e.g., a battery or solar panel, or a combination thereof. As described in greater detail below, the energy source 20 may be different than the energy source utilized to energize the barrier operator 14.

The controller 12 further includes a dimming device 22 communicatively coupled to the sensor 18 and the energy source 20. The dimming device 22 is configured to generate at least one of a modified current or a modified voltage in response to the modulation signal. The dimming device 22 may include a pulse width modulation device, a voltage control device, a current control device, a variable resistor, that is configured to control power output from the energy source to the light source etc. or a combination thereof. Thus, it is to be appreciated that any device capable of modulating at least one of electrical current or voltage can be used so long as it is compatible with the control board 26 and/or other elements of the controller 12.

Depending on the particular dimming device 22, the modified current can be generated in various ways. The modified current may include the rate of a cycle (e.g., on/off) of the current, the amount of current, or a combination thereof. For example, in embodiments when the pulse width modulation device is utilized, its repeated on/off cycles lead to cycling of the voltage which reduces the average current provided therefrom over a period of time. In contrast, in embodiments when the variable resistor is utilized, its resistance leads to a reduction in current provided therefrom.

Alternatively, the modified voltage can be generated by the dimming device 22 in various ways. The modified voltage may include the cycling (e.g., on/off) of the voltage. For example, in embodiments when the pulse width modulation device is utilized, its repeated on/off cycles lead to cycling of the voltage. Alternatively, the voltage may also be modified by selecting one of a plurality of preset voltages. In these and other embodiments, the controller 12 may further include an LC circuit communicatively coupled to the pulse width modulation device. The pulse width modulation device may be configured to generate the modified voltage. To this end, the LC circuit may be configured to receive the modified voltage and generate the modified current.

The controller 12 further includes a light source 24 electrically coupled to the dimming device 22 and configured to illuminate in response to at least one of the modified current or the modified voltage. In some embodiments, the light source 24 includes a light emitting diode. It is to be appreciated that any light source may be utilized so long as it is capable of receiving at least one of the modified current or the modified voltage at allows for illumination at two or more different power levels.

The controller 12 further includes a control board 26 communicatively coupled to the sensor 18 and the dimming device 22, and electrically coupled to the energy source 20. In various embodiments, the control board 26 performs computing operations and accesses electronic data stored in a memory module. The control board 26 may be communicatively coupled to the various components of the controller 12 through a communication channel. The communication channel may be wired, wireless, or a combination thereof. Examples of wired communication channels include, but are not limited to, wires, fiber optics, and waveguides. Examples of wireless communication channels include, but are not limited to, Bluetooth, Wi-Fi, other radio frequency-based communication channels, and infrared. The control board 26 may be further configured to be communicatively coupled with the barrier operator 14, a vehicle or a receiver located distant from the controller 12. It is to be appreciated that the control board 26 may include processors for performing computing operations and accessing electronic data stored in the memory.

In one exemplary embodiment, the sensor 18 includes the ambient light sensor. The ambient light sensor may be any sensor capable of determining visible light intensity known in the art. The ambient light sensor is configured to determine an amount of light proximate the controller 12 and generate a modulation signal in response to the amount of light. It is to be appreciated that the ambient light sensor may be free of any generation of the modulation signal depending on the amount of light proximate the controller 12. In various embodiments, the control board 26 has an illumination profile and is configured to apply the amount of light determined by the ambient light sensor to the illumination profile for generating the modulation signal. In exemplary embodiments, the illumination profile provides an increase in modulation signal relative to an increase in the amount of light determined by the ambient light sensor. Alternatively, in other exemplary embodiments, the illumination profile provides an increase in modulation signal relative to an increase in the amount of light determined by the ambient light sensor and renders the ambient light sensor free of any generation of the modulation signal when an insufficient amount of light is proximate the controller 12.

For example, during the daytime, the amount of light proximate the controller 12 may be at an elevated level due to incident sunlight. To improve visibility of the light source 24 during the day, the increased modulation signal resulting from the ambient light sensor may instruct the dimming device 22 to increase the electrical current or voltage to the light source 24 thereby increasing the brightness of the light source 24. On the other hand, during the nighttime, the amount of light proximate the controller 12 may be at a reduced level due to the lack of sunlight. To decrease eye strain resulting from the light source 24 at night, the reduced modulation signal resulting from the ambient light sensor may instruct the dimming device 22 to reduce the electrical current or voltage to the light source 24 thereby reducing the brightness of the light source 24.

In another exemplary embodiment, the sensor 18 includes the switch. The switch may be any device capable of opening and closing an electrical circuit known in the art. The switch is configured to be actuated by a user and generate the modulation signal in response to actuation of the switch. It is to be appreciated that the switch may be free of any generation of the modulation signal depending on the state of the switch. In various embodiments, the control board 26 has an illumination profile and is configured to apply the state of the electrical circuit of the switch to the illumination profile for generating the modulation signal. In exemplary embodiments, the illumination profile provides an increase in modulation signal at one of the open and closed states of the switch, and provides a decrease in modulation signal at the other of the open and closed states of the switch. Alternatively, in other exemplary embodiments, the illumination profile provides an increase in modulation signal at one of the open and closed states of the switch, and renders the switch free of any generation of the modulation signal at the other of the open and closed states of the switch.

Thus, it should be appreciated that the modulation signal may be proportionate to an environmental parameter (e.g., degree of ambient light) and therefore be variable, or that the modulation signal may be binary and therefore only vary between current or no-current (on/off) or a low current signal and high current signal (high/low).

As one example, during the daytime, the amount of light proximate the controller 12 may be at an elevated level due to incident sunlight. To improve visibility of the light source 24 during the day, the increased modulation signal resulting from the sensor may instruct the dimming device 22 to increase the electrical current or voltage to the light source 24 thereby increasing the brightness of the light source 24. On the other hand, during nighttime, the amount of light proximate the controller 12 may be at a reduced level. To decrease eye strain resulting from the light source 24 at night, the reduced modulation signal resulting from the sensor may instruct the dimming device 22 to reduce the electrical current or voltage to the light source 24 thereby reducing the brightness of the light source 24.

As another example, during use of the controller 12, a user may desire to see the status of the controller 12 based on the light source 24. The increased modulation signal resulting from the switch may instruct the dimming device 22 to increase the electrical current or voltage to the light source 24 thereby illuminating the light source 24. On the other hand, when the controller 12 is not being used by a user, it may be desirable to reduce the energy consumption of the controller 12 by reducing or eliminating the modulation signal resulting from the switch and thereby instructing the dimming device 22 to reduce or eliminate the electrical current or voltage to the light source 24.

In yet another exemplary embodiment, the controller 12 includes a housing and a cover movably coupled to the housing between an open position and a closed position. The sensor 18 may be proximate to the cover. In one embodiment, the sensor 18 includes the switch operatively coupled to the cover. In another embodiment, the sensor 18 includes the proximity sensor proximate to the cover. In some embodiments, the cover is pivotably coupled to the housing. In other embodiments, the cover is slidably coupled to the housing. However, it is to be appreciated that any configuration of the cover may be utilized so long as the cover can actuate the switch or the proximity sensor can determine movement of the cover. The sensor 18 is configured to determine whether the cover is in the open position or the closed position and generate the modulation signal in response to the position of the cover (e.g., when the cover is in the open position). It is to be appreciated that the sensor 18 may be free of any generation of the modulation signal when the cover is in the other of the open position or the closed position. In various embodiments when the sensor 18 is the switch, the control board 26 has an illumination profile and is configured to apply the state of the electrical circuit of the switch to the illumination profile for generating the modulation signal. As describe above, in exemplary embodiments, the illumination profile provides an increase in modulation signal at one of the open and closed states of the switch, and provides a decrease in modulation signal at the other of the open and closed states of the switch. Alternatively, in other exemplary embodiments, the illumination profile provides an increase in modulation signal at one of the open and closed states of the switch, and renders the switch free of any generation of the modulation signal at the other of the open and closed states of the switch.

As one example, when the cover is in the open position during use of the controller 12, a user may desire to see the status of the controller 12 based on the light source 24. The increased modulation signal resulting from the switch may instruct the dimming device 22 to increase the electrical current or voltage to the light source 24 thereby illuminating the light source 24. On the other hand, when the cover is in the closed position and the controller 12 is not being used by a user, it may be desirable to reduce the energy consumption of the controller 12 by reducing or eliminating the modulation signal resulting from the switch and thereby instructing the dimming device 22 to reduce or eliminate the electrical current or voltage to the light source 24.

As another example, the cover may include a translucent material that partially reduces the visibility of the light source 24 through the translucent material. When the cover is in the closed position, a user may desire to see the status of the controller 12 based on the light source 24 through the translucent material. The increased modulation signal resulting from the switch may instruct the dimming device 22 to increase the electrical current or voltage to the light source 24 thereby further illuminating the light source 24 such that the user can see the light source 24 through the translucent material. On the other hand, when the cover is in the open position and the controller 12 is being used by a user, it may be desirable to reduce the energy consumption of the controller 12 by reducing the modulation signal resulting from the switch and thereby instructing the dimming device 22 to reduce the electrical current or voltage to the light source 24.

In still another embodiment, the sensor 18 includes a timer. The timer may be any device capable of determining when an amount of time has lapsed. It is to be appreciated that a timer that sets one or more fixed times is also capable of determining when an amount of time has lapsed. The timer is configured to determine when a predetermined amount of time has lapsed and generate the modulation signal during the predetermined amount of time or in response to lapse of the predetermined amount of time. In various embodiments, the control board 26 has an illumination profile and is configured to apply the state of the timer to the illumination profile for generating the modulation signal. In exemplary embodiments, the illumination profile provides an increase in the modulation signal during a first time period, and provides a decrease in, or eliminates, the modulation signal at a second time period.

As one example, during the daytime, the amount of light proximate the controller 12 may be at an elevated level due to incident sunlight. To improve visibility of the light source 24 during the day, the timer may be configured to generate an increased modulation signal at the first time period to instruct the dimming device 22 to increase the electrical current or voltage to the light source 24 thereby increasing the brightness of the light source 24. On the other hand, during the nighttime, the amount of light proximate the controller 12 may be at a reduced level due to the lack of sunlight. To decrease eye strain resulting from the light source 24 at night, the timer may be configured to generate a reduced modulation signal at the second time period to instruct the dimming device 22 to reduce the electrical current or voltage to the light source 24 thereby reducing the brightness of the light source 24.

As another example, during the first time period when the controller 12 is being used by a user, a user may desire to see the status of the controller 12 based on the light source 24. The increased modulation signal resulting from the timer may instruct the dimming device 22 to increase the electrical current or voltage to the light source 24 thereby illuminating the light source 24. On the other hand, during the second time period when the controller 12 is not being used by a user, it may be desirable to reduce the energy consumption of the controller 12 by reducing or eliminating the modulation signal resulting from the timer and thereby instructing the dimming device 22 to reduce or eliminate the electrical current or voltage to the light source 24.

In still another embodiment, the sensor 18 includes a proximity sensor. The proximity sensor may be any device capable of determining the presence of movement proximate the controller 12, such as movement by a user, known in the art. The proximity sensor is configured to determine when a predetermined amount of movement has occurred proximate the controller 12 and generate the modulation signal in response to the occurrence of the predetermined amount of movement. It is to be appreciated that the proximity sensor may be free of any generation of the modulation signal when a predetermined amount of movement has not occurred proximate the controller 12. In various embodiments, the control board 26 has an illumination profile and is configured to apply the occurrence of movement to the illumination profile for generating the modulation signal. In exemplary embodiments, the illumination profile provides an increase in modulation signal in the presence of movement proximate the controller 12, and provides a decrease in modulation signal absent the presence of movement proximate the controller 12. Alternatively, in other exemplary embodiments, the illumination profile provides an increase in modulation signal in the presence of movement proximate the controller 12, and renders the proximity sensor free of any generation of the modulation signal absent the presence of movement proximate the controller 12.

For example, during use of the controller 12, a user may desire to see the status of the controller 12 based on the light source 24. The increased modulation signal resulting from the proximity sensor may instruct the dimming device 22 to increase the electrical current or voltage to the light source 24 thereby illuminating the light source 24. On the other hand, when the controller 12 is not being used by a user, it may be desirable to reduce the energy consumption of the controller 12 by reducing or eliminating the modulation signal resulting from the proximity sensor and thereby instructing the dimming device 22 to reduce or eliminate the electrical current or voltage to the light source 24.

The controller 12 may further include a second dimming device. The second dimming device may include a pulse width modulation device, a voltage control device, a current control device, a variable resistor, that is configured to control power output from the energy source to the light source etc. or a combination thereof. Thus, it is to be appreciated that any device capable of modulating at least one of electrical current or voltage can be used so long as it is compatible with the controller 12. In an exemplary embodiment, the second dimming device is a manual variable resistor dial or slider.

In some embodiments, the second dimming device is communicatively coupled to the dimming device 22. The second dimming device may be configured to receive the modulation signal and generate at least one of a second modified current or a second modified voltage based on modulation signal. At least one of the second modified current or the second modified voltage may be different than at least one of the modified current or the modified voltage. In these and other embodiments, the light source 24 is electrically coupled to the second dimming device and configured to illuminate in response to at least one of the second modified current or the second modified voltage thereby overriding at least one of the modified current or the modified voltage. The term "overriding" as utilized herein with regard to the light source 24 means that the light source 24 is directly responsive to at least one of the second modified current or the second modified voltage even though it may remain indirectly responsive to at least one of the modified current or the modified voltage or the current.

In other embodiments, the second dimming device is communicatively coupled to the energy source 20. The second dimming device may be configured to receive the modulation signal and generate at least one of a second modified current or a second modified voltage based on the current. In these and other embodiments, the light source 24 is electrically coupled to the second dimming device and configured to illuminate in response to at least one of the second modified current or the second modified voltage thereby overriding at least one of the modified current or the modified voltage. Once again, the term "overriding" as utilized herein with regard to the light source 24 means that the light source 24 is directly responsive to at least one of the second modified current or the second modified voltage even though it may remain indirectly responsive to at least one of the modified current or the modified voltage or the current. As such, it should be noted that the second dimming device may be configured to enhance or dampen the modified current or voltage from the first dimming device, or entirely override the modified current or voltage from the first dimming device and exclusively control the light source.

Moving on, the controller 12 includes a relay 28 electrically coupled to a device (in the example of FIG. 1 the gate operator) having an open (active) state and a closed (inactive) state. It is to be appreciated that the relay 28 may be any device capable of closing and opening an electrical circuit electronically, electromechanically, or a combination thereof. In various embodiments, the relay 28 is configured to provide any amount of electrical current to the device. Thus, the relay may be configured as an electromechanical relay or a software relay. In various embodiments, the controller 12 includes a plurality of relays coupled to a plurality of devices, respectively (e.g., one relay for each device such as a traffic light, a camera, a gate operator, a lock, etc.).

The relay 28 may be communicatively coupled to the control board 26. The relay 28 may be configured to generate a status signal in response to the device being in the open state or the closed state. The control board 26 may prevent or permit an electrical current being provided to the light source 24 in response to the status signal. For example, if a device is inactive and the controller 12 is configured to illuminate the LED indicator only when the device is active, the relay 28 may instruct the control board 26 to prevent the energy source 20 from illuminating the LED indicator regardless of whether the predetermined event has been satisfied by the sensor 18.

Suitable devices may include an electric motor, an actuator, hydraulics, pneumatics, mechanical locks, electromagnetic locks, or combinations thereof. However, it is to be appreciated that any device can be utilized that is responsive to electrical current. In various embodiments, one or more of the devices are associated with the barrier operator 14 (e.g., motor, mechanical locks, actuators, etc.). In other embodiments, one or more of the devices are associated with the movable gate 16 (e.g., electromagnetic locks). Furthermore, the device may include a traffic light, warning monitor, a tamper monitor, a lock, loitering monitor, gate position monitor, or combinations thereof. Moreover, the device may include a speed sensor, a position sensor, a safety sensor, or combinations thereof. The controller 12 may receive feedback information from one or more of these sensors or devices and uses this feedback to facilitate speed and position sensing to provide system control and safety detection.

Figure 2A:
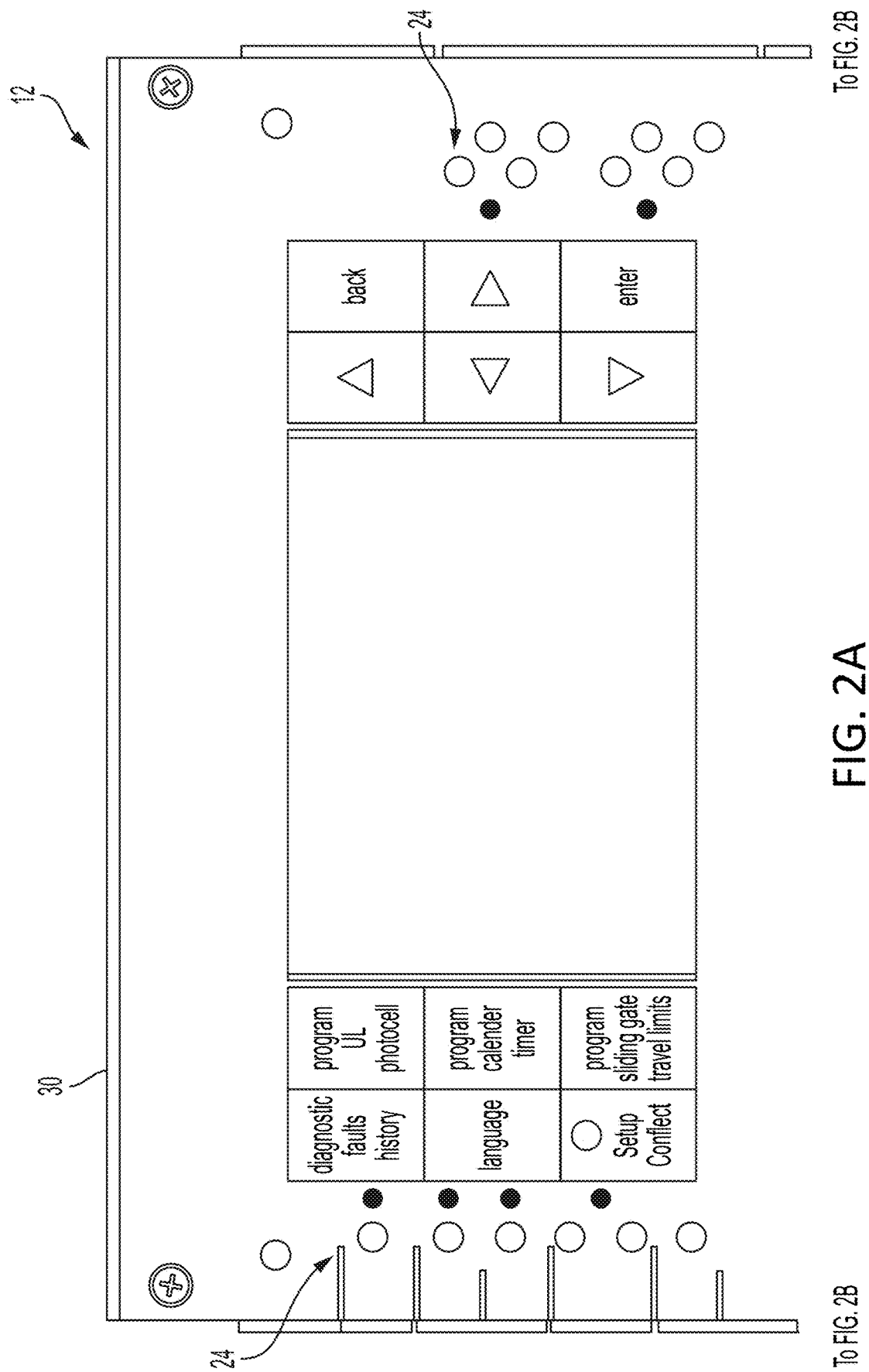
FIG. 2 is a schematic illustrating an embodiment of the controller of FIG. 1.
Figure 2B:
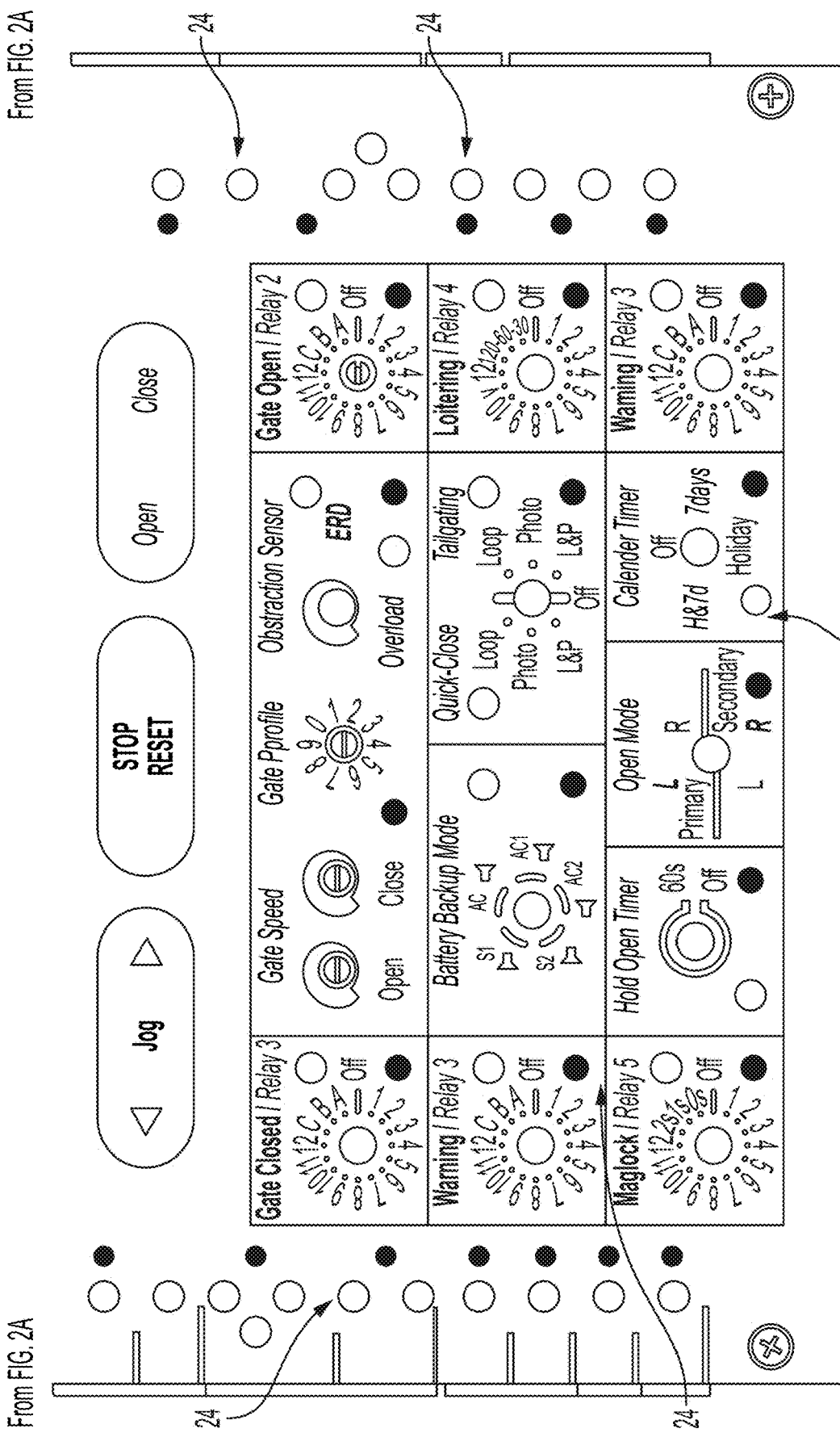

FIG. 2 is a schematic illustrating a non-limiting embodiment of the controller 12. In these and other embodiments, the controller 12 includes more than one light source 24. Each of the light sources 24 is associated with a device (e.g., a traffic light, warning monitor, a tamper monitor, a lock, loitering monitor, gate position monitor). Further, the light sources 24 may be associated with a variety of other functions of the controller 12, including radio in indicators, 12 Volt DC indicators, 24 Volt DC indicators, connectivity indicators, transponder indicators, and the like). As described above, each of the relays 28 associated with the devices are configured to generate a status signal that in turn leads to illumination of its LED indicator. In view of the controller 12 described above, illumination of the LED indicators can be modified in response to satisfying a predetermined event (e.g., dimmed at night and fully illuminated during the day).

With continuing reference to FIG. 2, the controller 12 may include a housing as described above. In these and other embodiments, the housing may include the sensor 18, the dimming device 22, and the light source 24. However, it is to be appreciated that the controller 12 may include a variety of other components described herein.

Referring back to the system 10, the barrier operator 14 may be any type of movable barrier operator suitable to actuate, operate, or otherwise control access via the movable gate. Thus, barrier operator 14 may be a swing barrier operator that swings open, a sliding barrier operator that moves a gate on a track, a locking mechanism that locks and unlocks a door to an entry, or any other type of operator suitable for controlling the type of movable gate that may be implemented with system 10. Typically, the barrier operator 14 may include a motor. For example, in a typical residential access control system having a dual swing gate arrangement where the gates pivot about respective axes to so open or close access into out egress out of a neighborhood, each gate may have the barrier operator 14 that is mechanically coupled to the movable gate 16 to so drive motion of the respective gate. The controller 12 may be electrically coupled to the barrier operators 14 to control operation of the motor in each of the barrier operators 14. In various embodiments, the controller 12 controls barrier operator 14 and provides programmed operation by executing a sequence of commands to the motor of the barrier operator 14 via a power amplifier to control the motor.

In certain embodiments, the motor is a DC motor, such as a 24 Volt DC permanent magnet brush-type motor. The power amplifier is electrically coupled to the controller 12 to deliver power to the motor. The power amplifier is adapted to interface with an energy source, such as an AC (alternating current) electrical outlet via a power cord (different than the energy source 20). During operation, the power amplifier receives electrical current from its power source and control signals from the controller 12, and outputs electrical current to the motor to energize the motor of the barrier operator. In such an embodiment, the power amplifier converts the AC electrical current to a DC electrical current. Alternatively, its power source could be a DC power source such as a battery.

A method for illuminating the light source 24 of the controller 12 is also provided. The controller 12 includes an energy source 20 configured to provide an electrical current. The method includes using a sensor to determine whether the predetermined event is satisfied and generating a modulation signal (e.g., on/off or increase/decrease in voltage and/or current) in response to the predetermined event. The method further includes generating at least one of the modified current or the modified voltage in response to the modulation signal. The method further includes illuminating the light source in response to at least one of the modified current or the modified voltage. The method further comprises generating a status signal of the device having an open state and a closed state in response to the device being in the open state or the closed state. In certain embodiments, the method further includes generating the status signal of the device having the open state and the closed state in response to the device being in the open state or the closed state.

In some embodiments, the sensor 18 includes the ambient light sensor. The step of determining whether the predetermined event is satisfied may include determining an amount of light proximate the controller utilizing the ambient light sensor and generating the modulation signal in response to the amount of light.

In other embodiments, the sensor 18 includes a switch. The step of determining whether the predetermined event is satisfied may include determining whether the switch has been actuated by a user and generating the trigger signal in response to actuation of the switch.

In yet other embodiments, the sensor 18 includes a switch or a proximity sensor operatively coupled to the cover or proximate to the cover, respectively. The step of determining whether the predetermined event is satisfied may include determining whether the cover is in the open position or the closed position utilizing the switch or the proximity sensor and generating the modulation in response to the position of the cover (e.g., when the cover is in the open position).

In still other embodiments, the sensor 18 includes a timer. The step of determining whether the predetermined event is satisfied may include determining whether the predetermined amount of time has lapsed utilizing the timer and generating the modulation signal in response to lapse of the predetermined amount of time.

In some embodiments, the numbers expressing quantities of ingredients, properties such as concentration, reaction conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. The recitation of ranges of values herein is merely intended to serve as a shorthand method of referring individually to each separate value falling within the range. Unless otherwise indicated herein, each individual value is incorporated into the specification as if it were individually recited herein.

All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise. As also used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously. Moreover, the term "electronically coupled" includes direct and indirect coupling, either through a wired conductive path or a wireless (e.g., optical, electromagnetic, etc.) communication path.

It should be apparent to those skilled in the art that many more modifications besides those already described are possible without departing from the inventive concepts herein. The inventive subject matter, therefore, is not to be restricted except in the scope of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification or claims refer to at least one of something selected from the group consisting of A, B, C . . . and N, the text should be interpreted as requiring only one element from the group, not A plus N, or B plus N, etc.

What is claimed is:

1. A controller for a barrier operator, comprising:
   an energy source configured to provide a current to the controller;
   a sensor configured to determine whether a predetermined event is satisfied and generate a modulation signal based on the predetermined event;
   wherein the sensor comprises an ambient light sensor, a switch, a timer, a proximity sensor, or combinations thereof, and/or wherein the light source comprises a light emitting diode;
   wherein (a) the sensor comprises the ambient light sensor, and wherein the ambient light sensor is configured to determine an amount of light proximate the controller and to generate the modulation signal in response to the amount of light, (b) wherein the sensor comprises the switch, and wherein the switch is configured to be actuated by a user and to generate the modulation signal in response to actuation of the switch, and/or (c) the sensor comprises the timer, and wherein the timer is configured to determine when a predetermined amount of time has lapsed and to generate the modulation signal during or after the predetermined amount of time;
   a dimming device communicatively coupled to the sensor and the energy source, the dimming device configured to generate at least one of a modified current or a modified voltage in response to the modulation signal; and
   a light source electrically coupled to the dimming device and configured to illuminate in response to at least one of the modified current or the modified voltage, wherein the light source is a status indicator for an operational parameter in the controller for the barrier operator.

2. The controller of claim 1, wherein the controller comprises a housing and a cover movably coupled to the housing between an open position and a closed position, wherein the sensor is proximate to the cover, and wherein the sensor is configured to determine whether the cover is in the open position or the closed position and to generate the modulation signal when the cover is in the open position.

3. The controller of claim 1, further comprising a second dimming device communicatively coupled to the dimming device and configured to receive the modified current and/or the modified voltage, wherein the second dimming device is configured to generate a second modified current and/or a second modified voltage based on the modified current and/or the modified voltage, and wherein the light source is electrically coupled to the second dimming device and configured to illuminate in response to the second modified current and/or the second modified voltage, thereby overriding the modified current and/or the modified voltage.

4. The controller of claim 1, further comprising a second dimming device communicatively coupled to the energy source and configured to receive the current, wherein the second dimming device is configured to generate a second modified current and/or a second modified voltage based on the current, and wherein the light source is electrically coupled to the second dimming device and configured to illuminate in response to the second modified current and/or the second modified voltage thereby overriding the modified current and/or the modified voltage.

5. The controller of claim 1, wherein the dimming device comprises a pulse width modulation device, a variable resistor, or a combination thereof.

6. The controller of claim 1, further comprising a relay electrically coupled to a device having an open state and a closed state, wherein the relay is configured to generate a status signal in response to the device being in the open state or the closed state, and wherein the device is selected form the group consisting of an electric motor, an actuator, a mechanical lock, an electromagnetic lock, a traffic light, a warning monitor, a tamper monitor, a lock, a loitering monitor, and a gate position monitor.

7. The controller of claim 6, wherein the relay is electrically isolated from the light source.

8. The controller of claim 1, further comprising a housing, wherein the housing encloses the sensor, the dimming device, and the light source.

9. A method for illuminating a light source of a controller for a barrier operator, the controller being electrically coupled to an energy source that is configured to provide a current, the method comprising:
   determining whether a predetermined event is satisfied and generating a modulation signal in response to the predetermined event;
   wherein the predetermined event is determined by a sensor, and wherein the sensor comprises an ambient light sensor, a switch, a timer, a proximity sensor, or combinations thereof, and/or wherein light source comprises a light emitting diode;
   wherein when (a) the sensor comprises the ambient light sensor, and wherein the step of determining whether the predetermined event is satisfied comprises determining an amount of light proximate the controller utilizing the ambient light sensor, the modulation signal is generated in response to the amount of light, (b) the sensor comprises a switch, and wherein the step of determining whether the predetermined event is satisfied comprises determining whether the switch has been actuated by a user, the modulation signal is generated in response to actuation of the switch, and/or (c) the sensor comprises a timer, and wherein the step of determining whether the predetermined event is satisfied comprises determining whether a predetermined amount of time has lapsed utilizing the timer, the modulation signal is generated during or after the predetermined amount of time;
   generating, by a dimming device, a modified current and/or a modified voltage in response to the modulation signal; and
   illuminating the light source in response to the modified current and/or the modified voltage, wherein the light source is a status indicator for an operational parameter in the controller for the barrier operator.

10. The method of claim 9, wherein the controller comprises a housing and a cover movably coupled to the housing between an open position and a closed position, wherein the sensor is proximate to the cover, and wherein the step of determining whether the predetermined event is satisfied comprises determining whether the cover is in the open position or the closed position utilizing the switch, the modulation signal is generated when the cover is in the open position.

11. The method of claim 9, wherein the modulation signal is generated by a sensor, and wherein the dimming device comprises a pulse width modulation device, a variable resistor, or a combination thereof.

12. The method of claim 9, wherein the controller is electrically coupled to a device via a relay, and wherein the method further comprises generating a status signal of the device having an open state and a closed state in response to the device being in the open state or the closed state.

13. The method of claim 12, wherein the relay is electrically isolated from the light source.

14. The method of claim 12, wherein the device is selected from the group consisting of an electric motor, an actuator, a mechanical lock, and an electromagnetic lock.

15. The method of claim 12, wherein the device is selected from the group consisting of a traffic light, a warning monitor, a tamper monitor, a lock, a loitering monitor, and a gate position monitor.

16. The method of claim 9, wherein the controller further comprises a housing, and the housing comprises a sensor that determines the predetermined event, the dimming device, and the light source.

17. A controller for a barrier operator, comprising:
an energy source configured to provide a current to the controller;
a sensor configured to determine whether a predetermined event is satisfied and generate a modulation signal based on the predetermined event;
a dimming device communicatively coupled to the sensor and the energy source, the dimming device configured to generate at least one of a modified current or a modified voltage in response to the modulation signal; and
a light source electrically coupled to the dimming device and configured to illuminate in response to at least one of the modified current or the modified voltage, wherein the light source is a status indicator for an operational parameter in the controller for the barrier operator; and
wherein the controller comprises a housing and a cover movably coupled to the housing between an open position and a closed position, wherein the sensor is proximate to the cover, and wherein the sensor is configured to determine whether the cover is in the open position or the closed position and to generate the modulation signal when the cover is in the open position.

18. A method for illuminating a light source of a controller for a barrier operator, the controller being electrically coupled to an energy source that is configured to provide a current, the method comprising:
determining whether a predetermined event is satisfied and generating a modulation signal in response to the predetermined event;
wherein the predetermined event is determined by a sensor, and wherein the sensor comprises an ambient light sensor, a switch, a timer, a proximity sensor, or combinations thereof, and/or wherein light source comprises a light emitting diode;
wherein the controller comprises a housing and a cover movably coupled to the housing between an open position and a closed position, wherein the sensor is proximate to the cover, and wherein the step of determining whether the predetermined event is satisfied comprises determining whether the cover is in the open position or the closed position utilizing the switch, the modulation signal is generated when the cover is in the open position;
generating, by a dimming device, a modified current and/or a modified voltage in response to the modulation signal; and
illuminating the light source in response to the modified current and/or the modified voltage, wherein the light source is a status indicator for an operational parameter in the controller for the barrier operator.

* * * * *